United States Patent Office 3,259,636
Patented July 5, 1966

3,259,636
PROCESS OF PRODUCING ESTERS OF CIS-2,5-TETRAHYDROFURAN DICARBOXYLIC ACID
Baak W. Lew, Wilmington, Del., assignor to Atlas Chemical Industries, Inc., Wilmington, Del., a corporation of Delaware
No Drawing. Filed June 3, 1963, Ser. No. 284,839
The portion of the term of the patent subsequent to Dec. 21, 1982, has been disclaimed
4 Claims. (Cl. 260—347.4)

The present invention relates to a process for the production of tetrahydrofuran derivatives and in particular, to the production of esters of cis-2,5-tetrahydrofuran dicarboxylic acid (THFDCA) by a hydrogenation and esterification reaction involving dehydromucic acid (DHMA) and an alcohol.

In accord with the present invention, THFDCA esters are initially prepared by reacting hydrogen, DHMA acid and an alcohol. The reaction involves the simultaneous hydrogenation and esterification of DHMA. Alcohols suited to use in the present invention may be saturated or unsaturated. Suitable alcohols, for example, are: (1) aliphatic alcohols, such as methyl, ethyl, and propyl; (2) substituted polyols, such as ethylene glycol, propylene glycol and glycerol, or; (3) aryl alkyl alcohols such as phenoxyethanol. Alcohols having a chain length of from 1 to about 12 carbon atoms are eminently satisfactory for use in the present invention. Preferably an excess of the alcohol component over the stoichiometric amounts required for the reaction is utilized. An esterification catalyst, such as p-toluene sulfonic acid, may be added to the reactants to hasten the speed of the reaction, however, an esterification catalyst is not essential to the reaction of the present invention. The present process is effectively carried out in the presence of a noble metal catalyst. While a wide variety of catalysts are suitable for use in the process of the present invention, it has been found that satisfactory results are obtained with noble metal catalysts which are supported on materials such as kieselguhr, charcoal, or activated clay. The reaction suitably takes place at a reasonable rate in the presence of from about 0.1 to about 5.0% of a noble metal catalyst (based on the weight of the DHMA starting material). Usually amounts of catalyst of over 5.0% yield no obvious improvement in the reaction.

The process of the present invention takes place over a relatively short period of time as compared to analogous prior art hydrogenations or esterifications. Generally the process of the present invention is complete within a time period of 6 hours or less. The reaction conditions are maintained for a sufficiently long time that the reaction is substantially completed and a respectable yield in the order of at least 70% of the theoretical is obtained. A reaction time of from about 2 to about 6 hours has been found to be eminently satisfactory.

The pressure at which the reaction of the present invention takes place is not critical within a rather wide range. For example, while a slight pressure, about 30 p.s.i.g., is desirable to facilitate the hydrogenation reaction, no upper pressure limit, except that dictated by equipment limitations, can be set. Pressures of 100 p.s.i.g. and above usually facilitate a practical rate of hydrogenations.

The present invention utilizes temperatures which are sufficiently high to carry out the reaction at a reasonable rate but not sufficiently high to cause decomposition of the starting material or product. Temperatures of up to 200° C. generally may be employed without difficulty of decomposition. Temperatures of 150° C. and higher generally cause the reaction to proceed at a practical rate. A temperature range of between 120° C. and 200° C. has been found to be eminently satisfactory for carrying out the present reaction.

The ester products of the present invention are useful as resin intermediates. The present esters which include alcohol components of 6 carbon atoms or more are aptly suited as plasticizers in resin compositions particularly where a relatively non-volatile plasticizer is required.

The following examples are illustrative of the process of the present invention:

*Example 1*

70 grams of DHMA (0.45 mol), 1 liter of methanol, 7 grams of a 5% palladium catalyst supported on charcoal, and 0.22 gram of p-toluene sulfonic acid monohydrate were placed in a stirring autoclave. The mixture was placed under an initial hydrogen pressure of 1400 p.s.i.g. at room temperature. The reaction was initiated by raising the temperature in the autoclave to 100° C. over a period of 15 minutes. The temperature was maintained at 100° C. for an additional 45 minutes. The temperature was then raised to 190° C. over a period of 15 minutes and held at 190° C. for four hours. The reaction mixture was then cooled, the pressure reduced to atmospheric, and 0.01 gram of sodium bicarbonate added. The reaction mixture was then filtered to remove the catalyst and the filtrate was placed in a distillation flask and any remaining free methyl alcohol was removed from the mixture by distillation under water aspirator pressure. The residue was then distilled at 86° C. and 0.15 mm. pressure to yield 60 grams of colorless liquid, (corresponding to 71.2% of theory).

*Example 2*

100 grams of DHMA (0.64 mol), 1.1 liter of n-propyl alcohol, and 10 grams of a 5% palladium catalyst supported on charcoal were placed in a stirring autoclave. The autoclave was charged to a pressure of 1500 p.s.i.g. with hydrogen. The reaction temperature was maintained at 100° C. for one hour and then raised to 190° C. for four hours. At that time the reaction mixture was cooled and the pressure reduced to atmospheric. The reaction mixture was then filtered to remove the catalyst. The excess n-propyl alcohol was removed under water aspirator vacuum at a temperature of 75° C. to yield 153 grams (99% of theory) of a colorless di-n-propyl dehydromucate.

*Example 3*

100 grams of DHMA (0.64 mol), 886 grams of phenoxyethanol (6.4 mol) and 10 grams of a 5% palladium catalyst supported on charcoal were hydrogenated in a stirred autoclave under an initial pressure of 1500 p.s.i.g. of hydrogen. The reaction temperature was maintained at 100° C. for one hour and at 190° C. for a further three hour period. The reaction mixture was then filtered to remove the catalyst and the filtrate distilled at 0.5 mm. of Hg at 100° C. to remove the unreacted alcohol. The yield was 264 grams (99% of theory) of product.

What is claimed is:

1. A process of producing esters of cis-2,5-tetrahydrofuran dicarboxylic acid which comprises the steps of
reacting hydrogen, dehydromucic acid, and an alcohol
in the presence of from about 0.1% to about 5.0% of a noble metal catalyst, based on the weight of dehydromucic acid starting material,
for a time of between about 2 and 6 hours,
at a hydrogen pressure of at least about 30 p.s.i.g.
at a temperature of between 120 and 200° C.

2. The process of claim 1 wherein the alcohol has a chain length of from 1 to 12 carbon atoms.

3. The process of claim 1 wherein the noble metal catalyst is palladium.

4. The process of claim 1 wherein the noble metal catalyst is a supported catalyst.

No references cited.

HENRY R. JILES, *Primary Examiner.*

NICOLAS S. RIZZO, *Examiner.*